United States Patent [19]

Vogt et al.

[11] Patent Number: 4,700,636
[45] Date of Patent: Oct. 20, 1987

[54] ASH CLASSIFIER

[75] Inventors: Frederich H. Vogt, Westport; Stanley A. Bunk, Greenwich; John P. D'Acierno, Ridgefield, all of Conn.

[73] Assignee: Dorr-Oliver Incorporated, Stamford, Conn.

[21] Appl. No.: 922,365

[22] Filed: Oct. 23, 1986

[51] Int. Cl.$^4$ .............................................. F23J 1/00
[52] U.S. Cl. ............................ 110/165 A; 209/139.1; 110/245
[58] Field of Search ............... 110/165 R, 165 A, 245; 122/4 D; 209/139.1, 138 R

[56] References Cited

U.S. PATENT DOCUMENTS

| | | | |
|---|---|---|---|
| 2,330,793 | 9/1943 | Peebles | 209/139.1 |
| 2,708,033 | 5/1955 | Thomas | 209/139.1 |
| 2,781,300 | 2/1957 | Hoge | 209/139.1 |
| 3,397,657 | 8/1968 | Tada | 110/165 A |
| 4,598,653 | 7/1986 | Stringfellow et al. | 110/245 |

*Primary Examiner*—Henry C. Yuen
*Attorney, Agent, or Firm*—H. M. Snyder

[57] ABSTRACT

Apparatus is provided for withdrawing a stream of relatively static bed material from an operating fluidized bed reactor and gravity feeding it through a conduit to an exterior classifying chamber into which a downward flow of air is introduced. The airflow is turned in the classifier to move in an upward direction countercurrent to the flow of bed material. The velocity of the air is such that coarse bed material passes downwardly through the airflow and accumulates in the classifying chamber, while the fines are entrained in the upwardly moving airflow and both air and fines are introduced into the fluidized bed reactor.

5 Claims, 1 Drawing Figure

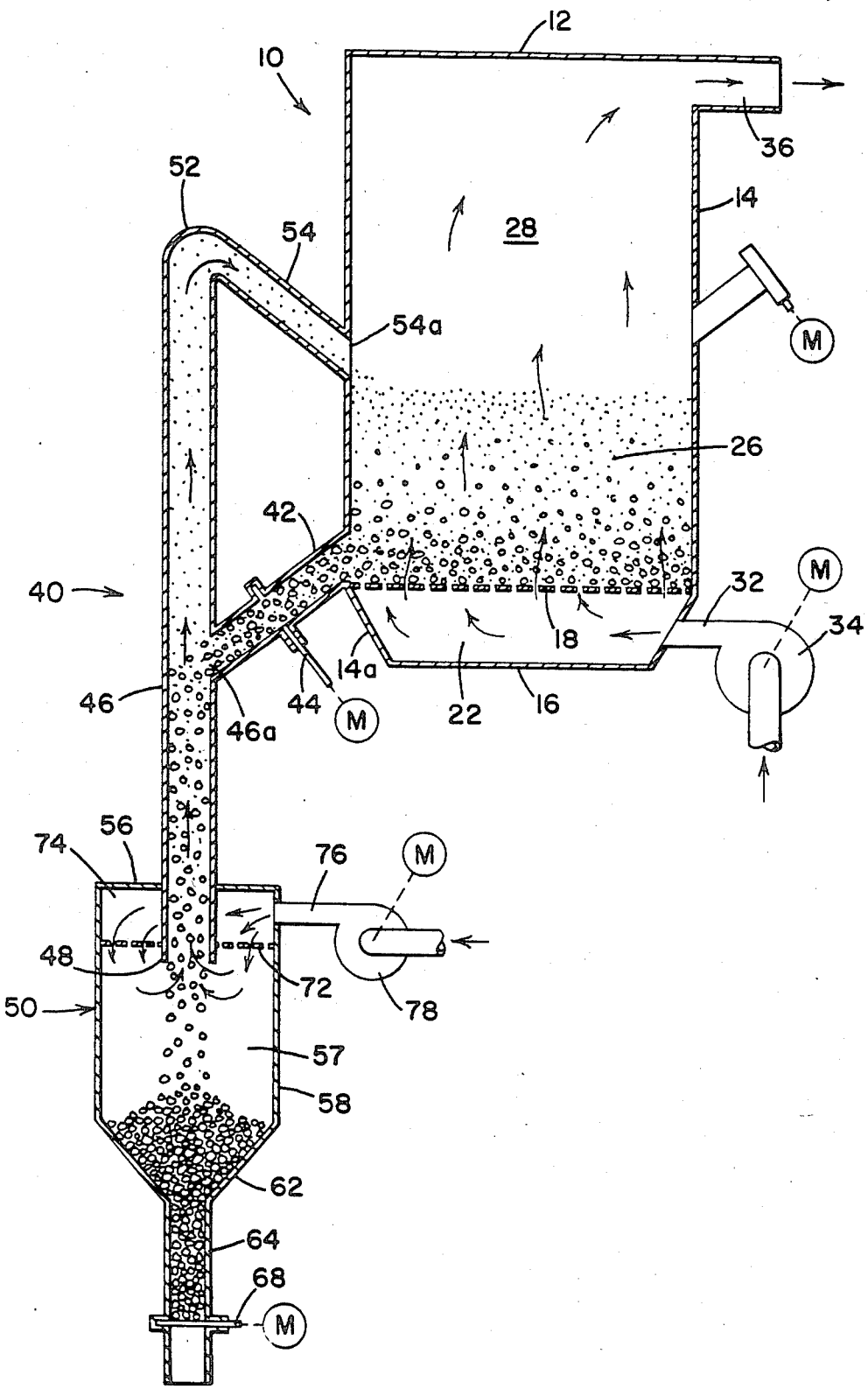

ASH CLASSIFIER

BACKGROUND OF THE INVENTION

1. Field of the Invention: This invention is directed to an ash classifier for use in combination with a fluidized bed reactor.

2. Description: Fluidized bed reactors are well known means for generating heat and, in various forms, can carry out the processes of drying, roasting, calcining, incineration and heat treatment of solids with gases in the chemical, metallurgical and other material processing fields. They are also used for the generation of hot gases, including steam, for use in driving electric power generation equipment, for process heat, for space heating, or for other purposes.

Fluidized bed reactors typically comprise a vessel having a substantially horizontal air distributor or constriction plate, which supports a bed of particulate solids in the reaction chamber and separates the reaction chamber from a windbox below the air distributor. Combustion air is introduced into the windbox and passes through the air distributor in sufficient volume to achieve a gas velocity that expands or fluidizes the solids bed, suspending the particulate solids of the bed in the flowing air stream and imparting to the individual particles a continuous random motion. A fluidized bed in appearance and properties resembles a boiling liquid. Conducting a combustion reaction in a fluidized bed has important advantages which include attainment of a substantially uniform bed temperature, combustion at relatively low temperatures and a high heat transfer rate.

Combustion of solid fuels such as coal involves the gasification of the organic component of the fuel leaving a residue of solid ash particles. The very finest ash particles will be elutriated by the gases flowing in the reactor and will exit through the stack with the exhaust gases. A large portion of the ash particles of a larger particle size will become part of the fluidized bed where they improve the operation of the fluidized bed by retaining heat and contacting and igniting fresh fuel particles. The elevated temperature of the fluidized bed and the continuous motion of the ash particles in that fluidized bed brings about numerous collisions between ash particles in a softened condition due to the elevated temperature. Under these conditions, ash agglomerates readily form and these agglomerates grow to a size such that they are no longer fluidizable and they descend to the bottom of the fluidized bed coming to rest upon the air distribution plate. An accumulation of large ash particles and large ash agglomerates on the air distribution plate will ultimately cause defluidization of the fluidized bed and subsequent shut-down to remove the unfluidized ash accumulation.

This problem has been recognized for some time and various schemes and devices have been put forth to remedy this condition. It is the purpose of the present invention to provide a simple but effective means for removing excess coarse ash particles and oversized ash agglomerates from the fluidized bed while returning the fines removed to the bed to maintain the fluidized condition of the bed.

SUMMARY OF THE INVENTION

The ash classifier system of this invention comprises a vessel external to the fluidized bed reactor which is arranged to separate the coarse particles including ash agglomerate and fine ash particles in an air stream, accumulating and disposing of the coarse particles and agglomerates and returning fine ash particles and combustion air to the fluidized bed.

The ash classifier system includes an ash vessel which is connected to the fluidized bed reactor by a system of conduits. An inclined conduit is arranged to remove bed material from the bottom portion of the fluidized bed by gravity feed. The inclined conduit joins a vertical classifier conduit and the feed enters the vertical conduit. The vertical conduit extends downwardly through the top of the ash vessel, terminating below the top wall and above the bottom wall of the ash vessel. The vertical conduit also extends upwardly above the juncture with the inclined conduit to a height above the level of the fluidized bed within the fluidized bed reactor. At its top most point, the vertical conduit terminates in an elbow or bend and a downwardly inclined conduit which penetrates the fluidized bed reactor wall is connected to the elbow. The downwardly inclined conduit is connected to a return port in the fluidized bed reactor wall at a point just above the level of the expanded fluidized bed within the reactor.

The ash vessel is provided with a windbox surrounding the vertical conduit within the vessel. An air distribution plate is spaced from the top of the ash vessel to form a windbox. The windbox is thus defined by the top of the ash vessel, the air distribution plate and the side wall of the ash vessel. An air conduit has access to the windbox through the wall of the ash vessel. The volume of the ash vessel below the air distribution plate constitutes an ash collection chamber. The bottom portion of the ash vessel is an inverted frustoconical configuration and the lowest point thereof is connected to a vertical descending conduit which has valve means therein.

The position of the air distribution plate and the direction of the flow of air therethrough and within the ash collection chamber minimizes the possibility that the air passages in the air distribution plate will become blocked by solids accumulation.

DESCRIPTION OF THE DRAWINGS

The drawing is a schematic view, partially in section, of a fluidized bed reactor connected to the ash classifier of the present invention.

DETAILED DESCRIPTION OF THE INVENTION

In the drawing, there is shown a fluidized bed reactor 10 connected to the ash classifier system 40 of the present invention. The fluidized bed 10 comprises a top wall 12, side wall 14 and bottom wall 16. The bottom wall 16 is connected to the side wall 14 by the windbox wall 14a. Within the fluidized bed reactor 10 in the lower portion thereof, there is positioned an air distribution plate 18 which separates a combustion chamber 28 above the air distribution plate from the windbox 22 below the air distribution plate. Fluidized bed material 26 rests on top of the air distribution plate 18 within the combustion chamber 28. A blower 34 is connected to the windbox 22 by the conduit 32. An exhaust conduit 36 is connected to the combustion chamber 28 at the top thereof and is further connected to an external stack (not shown).

The ash classifier system comprises an ash vessel 50 located at a lower level than the fluidized bed reactor 10 and an arrangement of conduits connecting the fluidized bed reactor to the ash vessel. The ash vessel has a top wall 56, a side wall 58 and the bottom wall 62. A downwardly inclined conduit 42 connects the lower portion of the fluidized bed reactor 10 just above the air distribution plate 18 with a vertically oriented classifier column 46. A valve 44 is located in conduit 42 to control the flow of material through the conduit. The vertical classifier column 46 extends downwardly through the top wall 56 of the ash vessel 50 and terminates within the ash vessel 50 at a point between the top wall 56 and the bottom wall 62. The bottom wall 62 may be of an inverted conical configuration open at its lowest point to disposal conduit 64 which extends vertically downward therefrom. Flow through conduit 64 is controlled by valve 68 located therein. Within ash vessel 50 there is located a perforated air distribution plate 72 which is located between the top 56 of the ash vessel and the end 48 of the vertical classifier column 46. The air distribution plate 72 contacts the wall 58 of the ash vessel and so divides the interior of the vessel into two compartments; a windbox 74 surrounding the conduit 46 above plate 72 and a collection chamber 57 below plate 72. The windbox is connected to a blower 78 by a conduit 76.

The vertical classifier conduit 46 extends upwardly past the juncture 46a with conduit 42 to a point well above the level of the fluidized bed material in the fluidized bed reactor 10. At the upper extremity of the classifier conduit 46 there is a bend 52 in the conduit, amounting to perhaps 135°, whereby the return conduit 54, which joins the bend 52 with return port 54a in the side wall 14 of the fluidized bed reactor 10, is inclined downwardly.

In operation, the fluidized bed reactor 10 has within the combustion chamber 28 therein a body of particulate material 26 which is supported on the air distribution plate 18. Air is supplied to the windbox 22 below the air distribution plate 18 by the blower 34 through conduit 32. The air from the windbox 22 moves through the perforations of the air distribution plate 18 into the bed material 26 and expands that bed to a substantial height within the combustion chamber 28. The expanded bed material 26 may not have a distinct upper surface and there may be a dilute concentration of very fine particles throughout the combustion chamber 28 with some portion of these finest particles leaving the combustion chamber 28 through the exhaust conduit 36. With the bed material 26 at elevated temperature, the air introduced through the air distribution plate 18 serves as combustion air in the combustion chamber 28 and combustion of the fuel in the bed occurs with the production of additional combustion gases. The incombustible ash constituent of the fuel generally remains as discrete ash particles in the fluidized bed, thereby serving a useful function as hot particles contacting incoming fuel particles and igniting them, and further, aiding in maintaining the fluidized condition of the fluidized bed. However, the fine ash particles will contact each other due to their continuous motion in the fluidized bed and, because they are incandescently hot, agglomeration of the fine softened particles will occur to some extent. As these particles grow, they are less susceptible to fluidization and they tend to descend to lower levels in the fluidized bed coming to rest upon the air distribution plate 18. With these coarse ash particles accumulating on or near to the ash distribution plate 18, defluidization of the fluidized bed can occur with costly shutdown for maintenance procedures.

The ash classifier system 40 is capable of removing a portion of the ash of mixed sizes from the fluidized bed 26, separating the fines removed from the coarse fraction and removing and disposing of the coarse fraction while returning the fine fraction to the fluidized bed to maintain fluidization. A portion of the fluidized bed material is therefore removed either continuously or intermittently from the bed through the downwardly inclined conduit 42. The bed material, both coarse and fine, moves down the inclined conduit 42 with the quantity thereof controlled by the valve 44. At the juncture 46a of conduits 42 and 46 the bed material moves into the vertical classifier conduit 46 and tends to drop vertically down toward the ash vessel 50.

Air is introduced into the ash vessel windbox 74 by the blower 78 through conduit 76. The air moves through windbox 74 and passes the air distribution plate 72 through the perforations therein. The air enters the ash collection chamber 57 moving in a vertically downward direction. The only exit from chamber 57 for this airflow is the vertical classifier conduit 46. Accordingly, the air swings into the conduit 46 around the end 48 thereof, making a 180° turn in direction to a vertically upward flow. The airflow in the vertical classifier conduit 46 is thus countercurrent to the flow of agglomerates and fines from the fluidized bed reactor.

The airflow in vertical conduit 46 is of a velocity such that the downward travel of coarse ash particles and ash agglomerates in vertical classifier conduit 46 is not interrupted, though it may be slowed. The coarse ash particles and agglomerates pass downward through the countercurrent of up-flowing air and reach collection chamber 57. The velocity of the air within conduit 46 is, however, sufficient to elutriate the fines portion of the ash so that the fines move upwardly entrained in the airflow. At the juncture of conduit 46 with conduit 42 the air and the entrained fines take the course of least resistance and continue vertically upwardly. The flow of air and fines reaches the bend 52 at the top portion of the vertical conduit 46 and turns downwardly into return conduit 54. Conduit 54 discharges through return port 54a into the combustion compartment 28 of the fluidized bed reactor 10. The fines are thus reintroduced into the fluidized bed 26 while the entraining air serves as additional combustion air in combustion compartment 28.

The coarse ash agglomerate falls downward in the collection chamber 57 and comes to rest in the bottom portion 62 of the ash vessel 58 and in disposal conduit 64. From time to time, valve 68 is opened to permit removal of a portion of the coarse agglomerate for disposal.

In a typical operation, coal particles up to $\frac{3}{4}$-inch average diameter are introduced into the fluidized bed reactor for combustion. The ash particles and agglomerates which are formed in the reactor and withdrawn from the bed range in size from extremely fine particles to particles and agglomerates 1-inch or more in diameter. Generally, it is desired to return ash particles of a size less than about $\frac{1}{4}$-inch average diameter to the fluidized bed reactor. The flow of air into the ash vessel windbox is adjusted to achieve the velocity of air in the vertical classifier conduit necessary to accomplish the desired classification.

It should be noted at this point that the position of the air distribution plate 72 near the top of the ash vessel 50 provides the very significant advantage that the plate perforations are practically immune from blockage by bed material. First of all, ordinarily no solids contact this plate, and secondly, the downward airflow through the plate perforations shields the plate from approaching particles and quickly removes any stray particles which may have approached or come to rest on the air distribution plate 72.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and the scope of the invention and appended claims.

We claim:

1. An ash classifier for a fluidized bed reactor comprising a first downwardly inclined conduit for receiving a stream of bed material from said reactor under gravity flow conditions, a second substantially vertical classifier conduit connected to said first conduit to receive the the bed material, an ash vessel having a top wall and a bottom wall, said second conduit extending through the said top wall and into said ash vessel, said second conduit terminating below said top wall and well above said bottom wall of said ash vessel, a perforated substantially horizontal air distributor plate located between said top wall of said vessel and the end of said second conduit within said ash vessel, the distributor plate being in surrounding relation to said vertical conduit and extending into contact with said side wall, the region between said top wall and said air distributor plate constituting a windbox, said second conduit extending vertically upward of the connection with said first conduit to a point above the level of bed material in said fluidized bed reactor, said second conduit having a bend at its highest point whereby said second conduit inclines downwardly from said highest point to connect with a port in the fluidized bed reactor for admitting a return flow of fines and air to the combustion compartment of the fluidized bed reactor.

2. The ash classifier of claim 1 wherein means is provided in said first conduit for controlling the stream of bed material from said reactor.

3. The ash classifier of claim 2 wherein said means is a slide valve.

4. The ash classifier of claim 3 wherein the region between said windbox and said bottom wall constitutes an ash collection chamber and conduit means is provided for withdrawal of ash accumulation from said chamber.

5. The ash classifier of claim 4 wherein a valve is provided in said conduit means to control the flow of ash from said chamber.

* * * * *